United States Patent [19]
Jensen

[11] 3,904,500
[45] Sept. 9, 1975

[54] HYDROGEN ISOTOPE SEPARATION FROM WATER

[75] Inventor: Reed J. Jensen, Los Alamos, N. Mex.

[73] Assignee: The United States of America as represented by the United States Energy Research and Development Administration, Washington, D.C.

[22] Filed: Dec. 17, 1973

[21] Appl. No.: 423,367

[52] U.S. Cl. .............................................. 204/162 R
[51] Int. Cl.² .......................................... B01J 1/10
[58] Field of Search .................... 204/157.1, 162 R

[56] References Cited
UNITED STATES PATENTS
2,713,025  7/1955  Billings ........................ 204/157.1 R OTHER PUBLICATIONS
Le Roy, Canadian Chemistry and Process Industries (June, 1944) pages 430, 431 and 451.

Mayer et al., Applied Physics Letters (Dec. 15, 1970) Vol. 17, No. 12, pages 516–519.

*Primary Examiner*—Howard S. Williams
*Attorney, Agent, or Firm*—John A. Horan; Edward C. Walterscheid

[57] ABSTRACT

A process for separating tritium from tritium-containing water or deuterium enrichment from water by selective, laser-induced two-photon excitation and photodissociation of those water molecules containing deuterium or tritium followed by immediate reaction of the photodissociation products with a scavenger gas which does not substantially absorb the laser light. The reaction products are then separated from the undissociated water.

5 Claims, 3 Drawing Figures

HYDROGEN ISOTOPE SEPARATION FROM WATER

BACKGROUND OF THE INVENTION

The invention described herein was made in the course of, or under, a contract with the U.S. ATOMIC ENERGY COMMISSION. It relates to a method of isotope separation based on selective excitation of isotope species and more particularly to a method wherein the selective excitation is initiated by laser means.

There are three isotopes of hydrogen: H, with at. wt. 1; D, with at. wt. 2; and T, with at. wt. of 3. Deuterium occurs in only about one part in six thousand of natural hydrogen. Tritium is unstable, with a half-life of 12.5 years. Deuterium and tritium have substantial utility in various nuclear applications, including nuclear weapons and controlled thermonuclear research. Unfortunately, tritium is produced in small quantities as a highly unwanted contaminant in nuclear reactor cooling water. It is necessary as a part of nuclear reactor waste management that such tritium be removed from the cooling water before the water is returned to the natural environment.

With the advent of lasers tunable to very narrow frequencies over a wide range of the spectrum, it has become apparent that by controlling the spectral response of the interaction of light with matter, it is possible, in principle, to produce selective reactions that can change the composition and properties of the matter. The conditions required to achieve such selectivity are: (1) high monochromaticity of the exciting light; (2) the selectivity of the primary process of light interaction with the matter (the existence of narrow nonoverlapping absorption lines); and (3) conservation of the induced selectivity in successive physical and chemical processes. See, e.g., R. V. Ambartzumian and V. S. Letokhov, "Selective Two-Step (STS) Photoionization of Atoms and Photodissociation of Molecules by Laser Radiation," 11 Applied Optics 354 (1972).

The literature reveals several reports of laser-induced separation of hydrogen isotopes. For example, Mayer et al., state that by irradiating a mixture of 50% methanol ($H_3COH$) and 50% deuteromethanol ($D_3COD$) with an HF laser in the presence of gaseous bromine ($Br_2$), substantially all of the $H_3COH$ reacted with the $Br_2$ whereas very little of the $D_3COD$ did. The net result reported was that the $D_3COD$ concentration was increased from 50% to 95%. See 17 Applied Physics Letters 516 (1970). Yeung and Moore disclose a ratio of enrichment $D_2:H_2$ of about 6:1 in the products of the photopredissociation of a 1:1 mixture of $H_2CO$ and $D_2CO$ by a frequency-doubled ruby laser operating at 3472 A. 21 Applied Physics Letters 109 (1972).

The most inexpensive and widely available source of natural hydrogen is water. Unfortunately, these teachings in the art require the hydrogen to be present in methanol or formaldehyde. It is believed that the preliminary transformation from water to some other hydrogen-carrying chemical unduly increases the expense of any isotope separation scheme. Accordingly, it would be most advantageous for the highly selective laser method of separation of hydrogen isotopes to operate on the water molecule.

SUMMARY OF THE INVENTION

Selective excitation and photodissociation of those molecules containing either tritium or deuterium by laser light forms the basis of an efficient method for removing tritium from water or deuterium enrichment from water. The dissociation products are made to react rapidly with a scavenger gas that is not affected by the laser irradiation. The reaction products are then separated from the undissociated water. Ethylene is particularly appropriate for use as a scavenger gas.

Broadly, the process of the invention comprises (1) vaporizing water containing deuterium or tritium, (2) mixing the water vapor with ethylene, (3) irradiating the mixture of water vapor and ethylene with light from a first laser of a frequency which excites water molecules containing a particular isotopic species of hydrogen, e.g., deuterium or tritium, (4) simultaneously irradiating the mixture with light from a second laser of a frequency sufficient to photodissociate those molecules excited by the light from the first laser but not to photodissociate those molecules not excited by the first laser light, both lasers having frequencies that are not substantially absorbed by the ethylene, and (5) separating the reaction products produced by the reaction of the photodissociation products with the ethylene from the undissociated water.

LASER ISOTOPE SEPARATION

Figure 1:
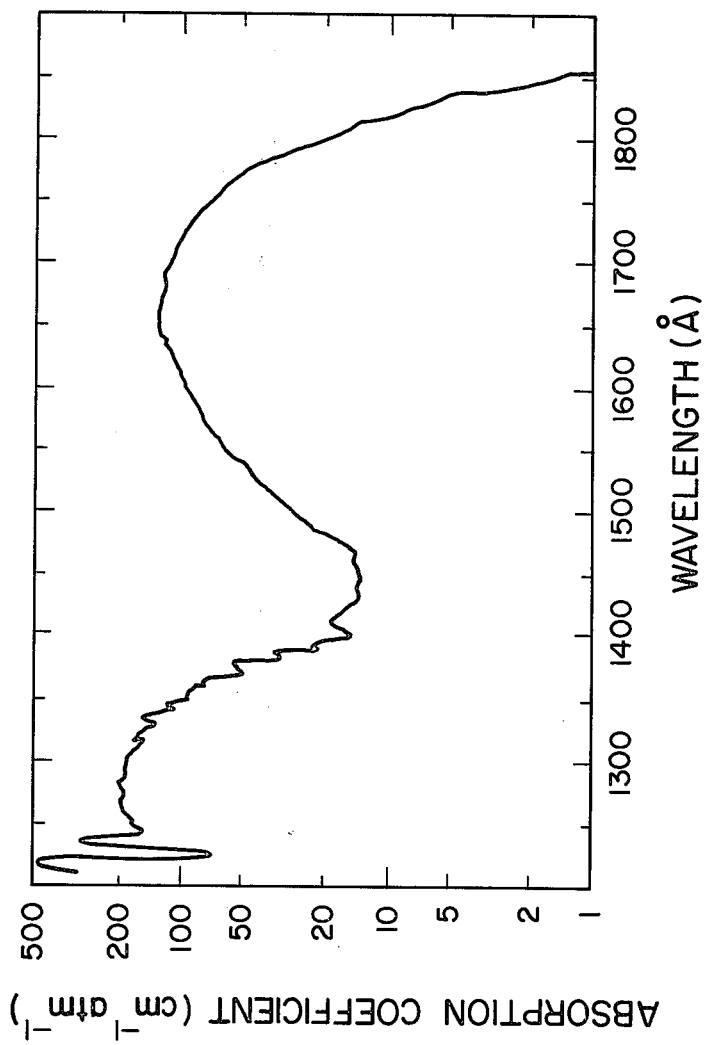
FIG. 1 is the ultraviolet room temperature absorption spectrum of water in the region 1200 to 1900 A.

For every molecule, there is a minimum energy state called the ground state. Above this ground state are additional discrete energy states. A molecule in the ground state or excited to a particular energy state may be excited to a higher energy state by absorption of radiation of the proper frequency. In accordance with quantum theory, molecular spectra show that the energy states of a molecule correspond to (a) different electronic orbits, (b) different internuclear distances, (c) rotations of some elements of the molecule with respect to other elements of the molecule, or (d) particular combinations of these. The optical spectrum of energy absorbed when the molecule is excited from one energy state to another may thus consist of (a) a vibrational spectrum, (b) a rotational spectrum, or (c) a compound spectrum, e.g., a vibrational-rotational spectrum or a vibrational-electronic-rotational spectrum. For a polyatomic molecule no pure electronic absorption spectrum is possible.

In molecules containing different isotopes, the classical vibration frequencies differ according to $$|\Delta \nu| = \frac{1}{2} \frac{\Delta \mu}{\mu} \nu$$

where $\nu$ is the vibration frequency, and $\mu$ is the reduced mass of the molecule. The reduced isotopic mass difference $\Delta\mu$ is nonzero only if the isotopic atoms are in motion during the vibration. The resultant difference in frequency, $\Delta\nu$, is called the isotope shift. The isotope shift causes the absorption spectrum of molecules containing one isotopic species of an element to be somewhat shifted from that of molecules containing another isotopic species of that element. If the shift in the absorption spectrum is such that narrow nonoverlapping absorption lines exist for molecules containing the different isotopic species, then in principle light of the proper frequency will be absorbed only by and excite only molecules containing a particular isotopic species.

Laser isotopic separation is possible because the frequency purity of laser light is sufficient to be resonantly absorbed by one isotopic species without affecting other nonresonant isotopes. In any isotope separation process based on the slective excitation of isotopic species by tuned laser light, it is essential that the isotopic shift be as sharply delineated as possible. By selective excitation is meant the tuning of the laser light frequency to effect absorption by an optical absorption state of one isotope only.

To obtain very sharp spectral features, it is highly preferable that the isotopic mixture which is to undergo separation be in the gaseous state when it is irradiated with tuned laser light. Gaseous mixtures permit efficient interaction of the laser light with the desired isotopic species while at the same time limiting the possibility that selectively excited molecules will undergo scrambling, that is, transfer of their excitation to nonexcited species. It will be readily apparent that scrambling reduces the efficiency of isotope separation and if sufficiently severe may prevent any separation at all.

Even so, once selective excitation has been made to occur, there are numerous processes by which the slectivity may be lost. A primary loss mechanism even in the gaseous state is collisional energy transfer between molecules. Thus it is highly desirable that the selectively excited species be quickly transformed to a stable or metastable state. One means by which the selectivity can be stabilized is through photoionization or photodissociation of an excited species. The stabilizing effect of photodissociation in particular may be advantageously utilized if the photodissociation step is separated from the selective excitation step through use of photons or light quanta of differing energies $h\nu_1$ and $h\nu_2$. Photons of energy $h\nu_1$ excite a certain state of the discrete energy spectrum in a particular species, and photons of energy $h\nu_2$ photodissociate the excited species. The energies of the photons satisfy the following conditions:

$$h\nu_1 + h\nu_2 > E_d$$

$$h\nu_2 > E_d$$

where $E_d$ is the photodissociation energy of a molecule from the ground state.

DESCRIPTION OF THE PREFERRED EMBODIMENT

Absorption of ultraviolet radiation by a water molecule at any wavelength corresponding to a point on the absorption spectrum of FIG. 1 results in photolysis of the molecule. At wavelengths shorter than 2420 A it is energetically posssible for the photolysis to result in the following reactions:

$$H_2O \xrightarrow{h\nu} H + OH \quad (1)$$

$$H_2O \xrightarrow{h\nu} H_2 + O \quad (2)$$

Below 1290 A the following reaction is also energetically possible:

$$H_2O \xrightarrow{h\nu} 2H + O \quad (3)$$

Nonetheless, over the absorption spectrum given in FIG. 1, reaction (1) clearly predominates. The onset of absorption at 0.186 $\mu$m (53,760 cm$^{-1}$ or 6.66 eV) is well above the 5.113 eV or 41,250 cm$^{-1}$ dissociation energy of water into H + OH fragments, and absorption in this region of the spectrum produces these dissociation fragments with a quantum yield near unity. Even at 1236 A, about 75% of the primary processes in water photolysis are attributable to reactions (1) and (3).

Figure 2:
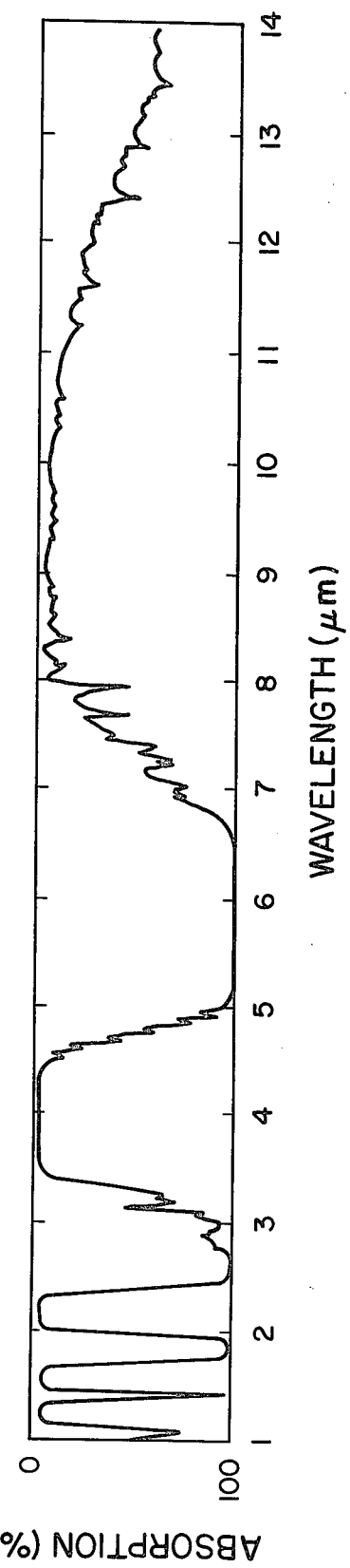
FIG. 2 is the infrared absorption spectrum at room temperature in the region from 1 to 13 $\mu$m.

The present very selective, energy conservative, two-photon dissociation process for separating hydrogen isotopes and removing tritium from water depends on coupling the ultraviolet absorption processes by which H atoms are produced in the photolysis of water with a preliminary selective vibrational excitation of those water molecules containing a particular hydrogen isotopic species. This preliminary vibrational excitation can readily be accomplished through use of an appropriately tuned infrared laser. FIG. 2 shows the infrared spectrum of water in the absorption region from 1 to 15 $\mu$m. The $\nu_3$ fundamental near 2.6 $\mu$m is of particular interest in that the precise absorption frequencies for water containing various hydrogen isotopic species are known for this fundamental. The values for these frequencies are given in the Table.

TABLE

| Molecule | Frequencies (cm$^{-1}$) | | |
|---|---|---|---|
| | $\nu_3$ | $\nu_1$ | $\nu_2$ |
| H$_2$O | 3935.59 | 3825.32 | 1653.91 |
| HDO | 3883.8 | 2820.3 | 1449.4 |
| D$_2$O | 2883.79 | 2758.06 | 1210.25 |
| DTO | 2830.7 | 2357.1 | 1117.9 |
| T$_2$O | 2436.12 | 2296.63 | 1017.89 |
| HTO | 3882.6 | 2365.0 | 1374.6 |

It is readily apparent that the HOT and HOD frequencies are well separated from each other and especially from the H$_2$O frequency. In this regard, it should be noted that laser light can be tuned to less than 0.001 cm$^{-1}$. It is thus a straightforward matter in this region of the infrared absorption spectrum to excite HOD or HOT from contaminated or natural water vapor while leaving the HOH in the ground state. The absorption strength near the $\nu_3$ fundamental at 2.6 $\mu$m is known to be only a few Torr centimeter so that infrared laser photons can be efficiently utilized.

Additionally, the very high oscillator strength and anharmonicity of water give rise to strong overtone absorption at 1.2 and 1.35 $\mu$m, as shown in FIG. 2, and at 0.8227, 0.7957, and 0.6994 $\nu$m. The very strong overtone at 1.35 $\mu$m displays a near coincidence with the frequencies of a number of good lasers such as iodine, N$_2$ first positive, Nd glass, and frequency-doubled HF that are operable in this region. The iodine laser is particularly advantageous in that it can be tuned somewhat with a magnetic field, thus vastly increasing the probability of a line coincidence. By using the water overtone at 1.35 $\mu$m, the preliminary infrared excitation provides about 7600 cm$^{-1}$ of energy, which in turn allows the use of a frequency-doubled Ar ion laser at 0.209 $\mu$m or 47,840 cm$^{-1}$ as the ultraviolet source. The combination of the excitation energy of 7600 cm$^{-1}$ with the 47,840 cm$^{-1}$ from the Ar ion laser gives a total energy imparted to the selectively excited water molecules of 55,440 cm$^{-1}$ or 0.180 $\mu$m. As can be seen from FIG. 1, this is well within the absorption region for water and indeed is in the region at which the absorption very efficiently results in the formation of H+OH.

A critical feature of the method of the present invention is the presence in the photolysis region of a gas which will rapidly and efficiently scavenge all atomic hydrogen produced as a result of the photolysis of selectively excited water molecules. The presence of such a scavenger is essential to avoid recombination of H atoms and OH free radicals or exchange reactions which result in scrambling. A scavenger must meet three important requirements:

1. It must permanently quench H and OH radicals without inducing subsequent significant chain reactions. It cannot form acids.
2. It must not absorb optically in the region where the ultraviolet or infrared laser operates.
3. It must be separable from water.

The art discloses that hydrogen atoms produced by the photolysis of water are rapidly and permanently scavenged by ethylene gas. See, e.g., McNesby et al., "Vacuum Ultraviolet Photochemistry. III. Primary Processes in the Vacuum Ultraviolet Photolysis of Water and Ammonia," 36 J. Chem. Phys. 605 (1962). In the event that the ultraviolet laser used operates at a wavelength shorter than 0.19 $\mu$m, it is desirable to use deuterated ethylene to minimize optical absorption by the scavenger.

Figure 3:
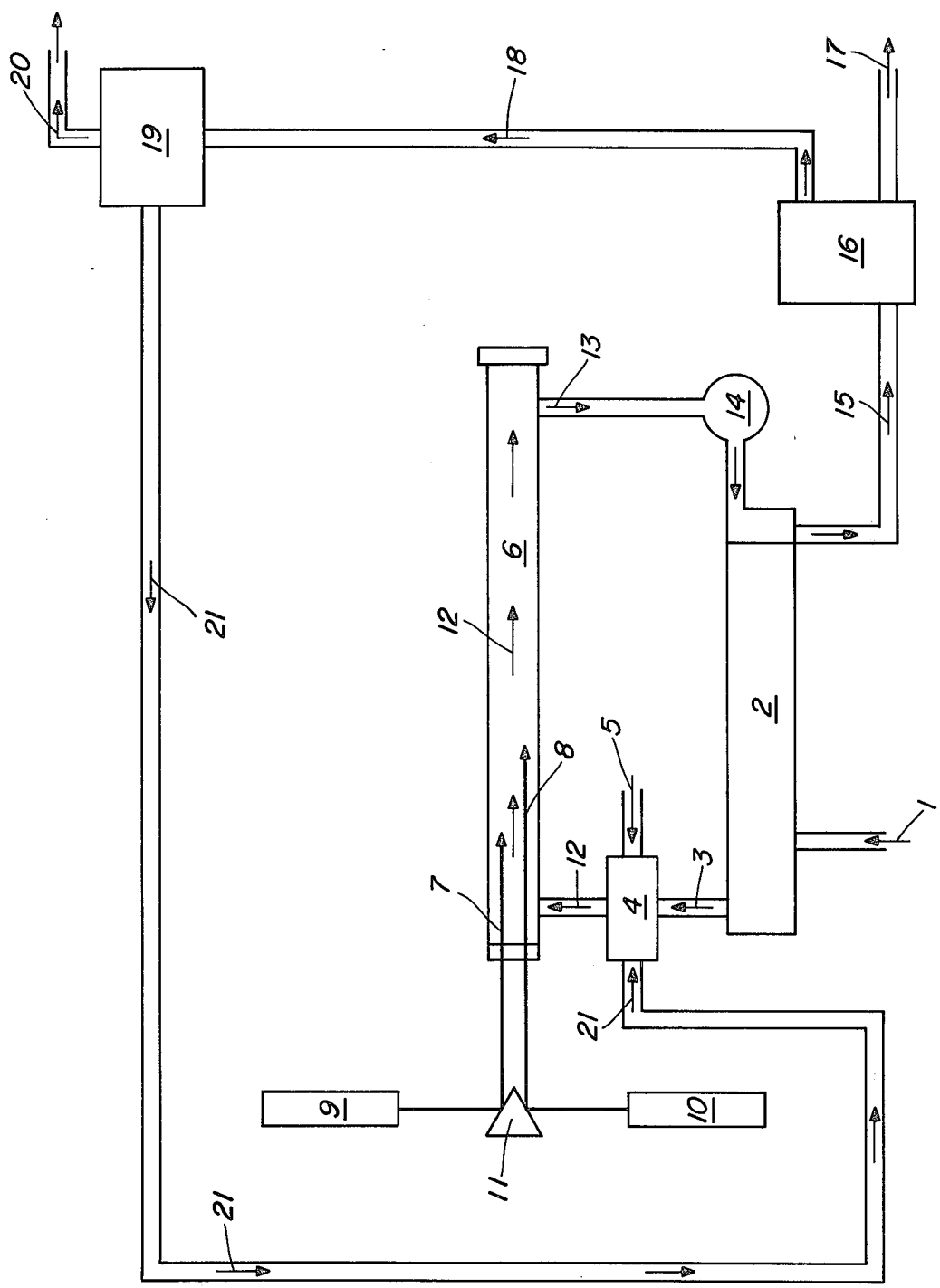
FIG. 3 is a schematic diagram showing an embodiment of the invention.

One mode of operation of the process of the invention is shown in FIG. 3. A flow 1 of natural water or water contaminated with tritium is fed into heat exchanger 2 where it is vaporized. The vapor 3 flows into mixing chamber 4 where it mixes with ethylene provided by feed 5 and reclaimed ethylene 21. The mixture 12 of ethylene and water vapor then flows through photolysis chamber 6. Within chamber 6 the water vapor is at approximately one Torr pressure and the ethylene is at a few Torr pressure. Laser radiation 7, 8 from infrared laser 9 and ultraviolet laser 10 is directed through the length of chamber 6 by mirror means 11. Water molecules containing deuterium or tritium are selectively excited by laser radiation 7 from infrared laser 9. Laser radiation 8 from ultraviolet laser 10 is sufficiently energetic to photolyze those water molecules excited by laser radiation 7. The lifetime of the vibrationally excited state of the selectively excited water molecules is about 100 nsec (10 collisions) which provides sufficient time for dissociation of these molecules by radiation 8 during the lifetime of the excited state. In one embodiment, radiation 7 is at a frequency at the 1.35 $\mu$m overtone of water. For this purpose, infrared laser 9 is an iodine laser magnetically tuned to selectively excite water molecules containing tritium or deuterium. Ultraviolet laser 10 is a frequency-doubled argon ion laser.

Within photolysis chamber 6 the H + OH fragments are rapidly scavenged by the ethylene and the mixture 13 of undissociated water, ethylene, and reaction products, then flows through compressor 14 where the water is condensed and the heat transferred to heat exchanger 2. The mixture 15 of condensed water, reaction products, and ethylene then flows to separation chamber 16 wherein the water 17 is removed and the mixture 18 of ethylene and other gaseous reaction products is transferred to separation chamber 19. In chamber 19 the ethylene 21 is removed from the reaction products 20. Among the reaction products 20 will be ethane, butane, and possibly $H_2$.

On the basis of the foregoing description it will be apparent that what has been disclosed is a laser isotope separation process wherein tritium may be removed from tritium-containing water and wherein a substantial enrichment of a desired hydrogen isotope, e.g., deuterium, may be achieved, using natural water as a source of natural hydrogen. By natural water is meant water containing a ratio of deuterium to hydrogen equivalent to that normally found in nature, i.e., about 1:6000.

What I claim is:

1. A method of removing tritium from tritium-containing water which comprises: (a) forming a vapor of said water, (b) mixing said vapor with ethylene, (c) irradiating said mixture with a first laser light of a frequency which selectively excites those water molecules containing tritium but not tritium free molecules, (d) simultaneously irradiating said mixture with a second laser light of a frequency sufficient to photodissociate water molecules selectively excited by said first laser light but not sufficient to photodissociate those water molecules not selectively excited by said first laser light, said first and second laser lights having frequencies that are not substantially absorbed by ethylene, and (e) separating undissociated water from the reaction products produced by the reaction of the photodissociation products of said excited water molecules with said ethylene.

2. The method of claim 1 wherein said first laser is iodine, $N_2$ first positive, Nd glass, or frequency-doubled HF and said second laser is frequency-doubled Ar ion.

3. The method of claim 1 wherein said first laser is magnetically tuned iodine.

4. A method of deuterium enrichment which comprises (a) forming a vapor of natural water, (b) mixing said vapor with ethylene, (c) irradiating said mixture with a first laser light of a frequency which selectively excites those water molecules containing deuterium but not those water molecules containing no deuterium, (d) simultaneously irradiating said mixture with a second laser light of a frequency sufficient to photodissociate water molecules selectively excited by said first laser light but not sufficient to photodissociate those water molecules not selectively excited by said first laser light, said first and second laser lights having frequencies that are not substantially absorbed by ethylene, and (e) separating undissociated water and unreacted ethylene from the reaction products produced by the reaction of the photodissociation products of said excited water molecules with ethylene.

5. The method of claim 4 wherein said ethylene is deuterated ethylene.

* * * * *